Aug. 20, 1963 N. CORDIS 3,101,070
POULTRY FEEDER HAVING A BAND TYPE CONVEYOR
Filed April 6, 1960 2 Sheets-Sheet 1
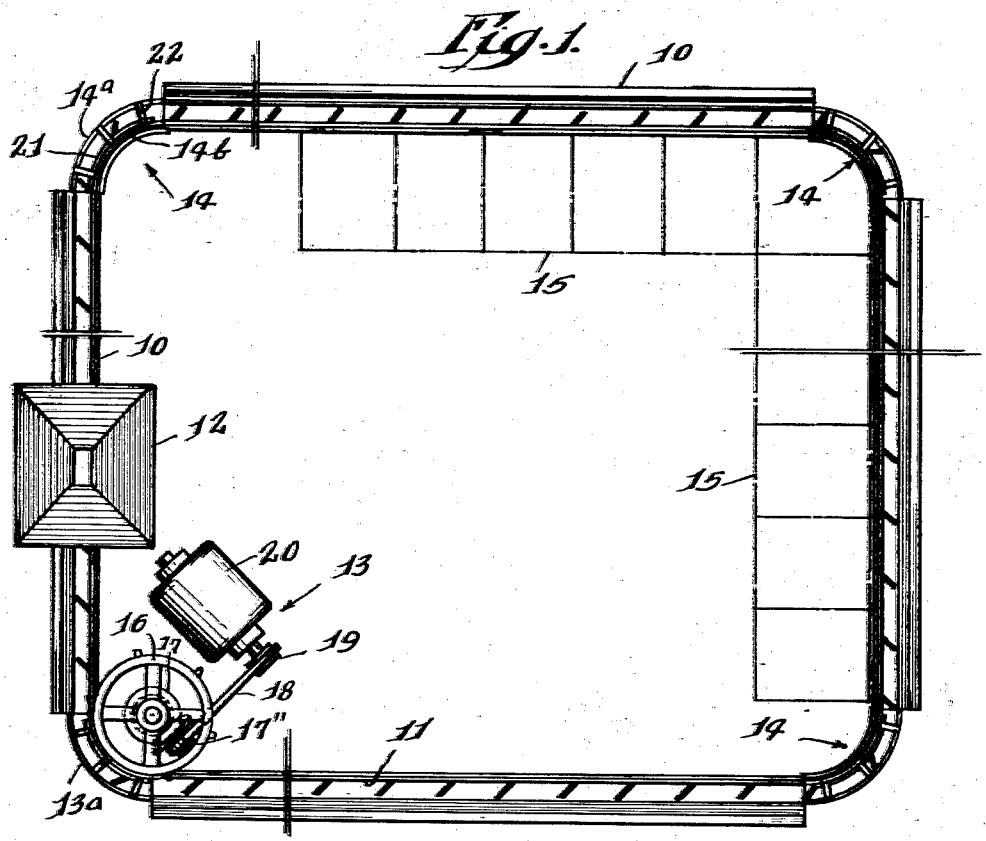
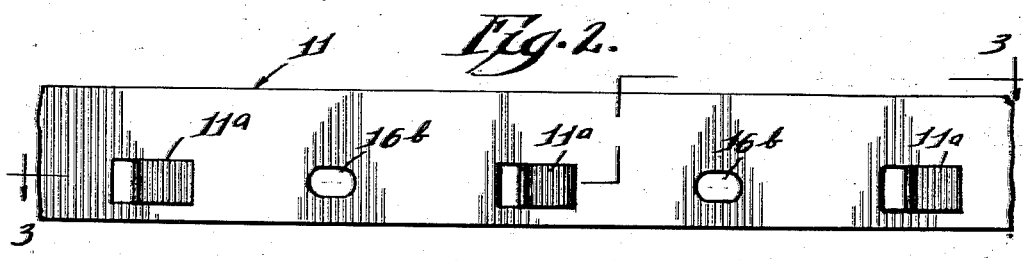
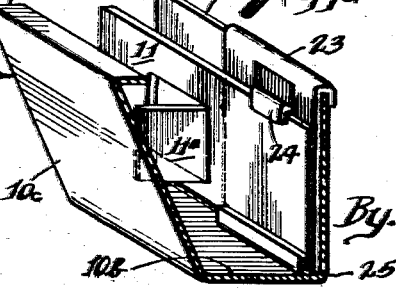
Inventor.
Nat Cordis.
By Everett A. Johnson
Attorney.

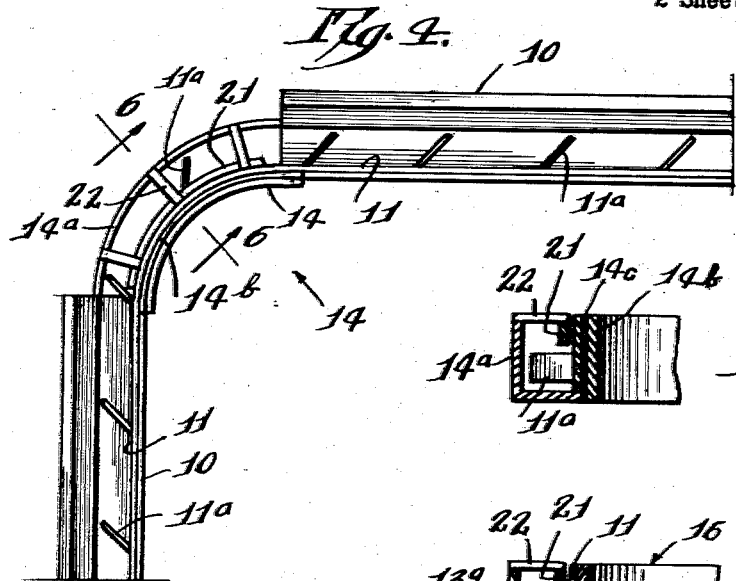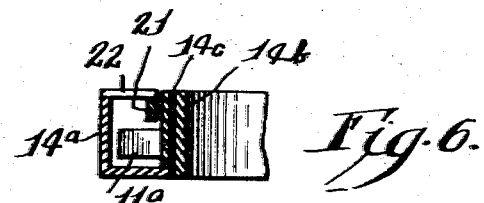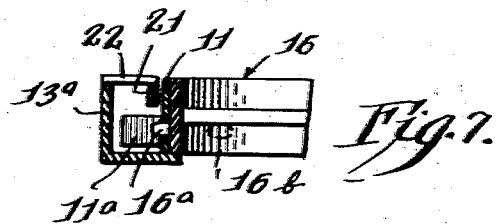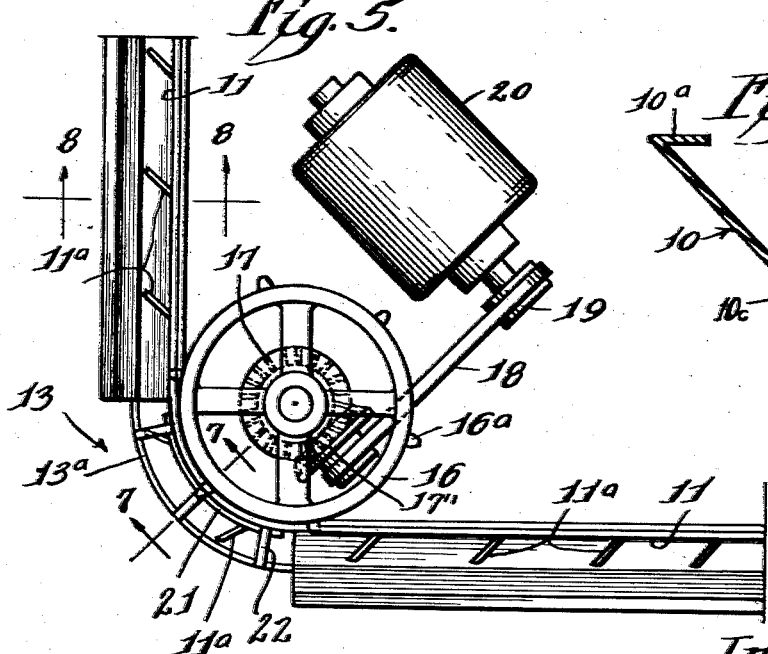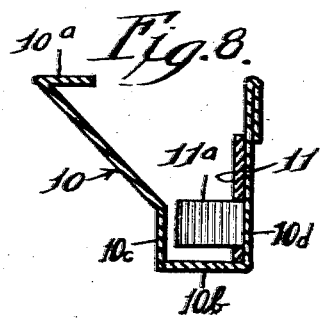

# United States Patent Office 3,101,070
Patented Aug. 20, 1963

3,101,070
POULTRY FEEDER HAVING A BAND TYPE
CONVEYOR
Nat Cordis, Crown Farms, Silver Lake, Wis.
Filed Apr. 6, 1960, Ser. No. 20,312
12 Claims. (Cl. 119—52)

This invention relates to conveyors for flowable solid materials and, more particularly, to a feeding device for distributing pulverant materials along an open-topped trough accessible to stock including poultry. More specifically, the invention is an improvement in a method and means for automatically distributing feed in a closed circuit trough-type poultry feeder.

The feeding of live stock, such as poultry, on a large scale necessarily involves much manual attention. Accordingly, a primary object of this invention is to provide a feeder of large capacity in which the feeding can be controlled with a minimum of attention by an operator. Another object is to provide a method and automatic means for uniformly distributing a supply of fresh feed within a continuous or closed circuit flock feeder. An additional object is to provide an automatic and controllable feeder which is silent in operation yet rugged and inexpensive in construction. A further object is to provide an apparatus which maintains a continuously renewed supply of feed in a continuous trough and minimizes the possibility of accumulating stale feed along the path of the conveyor. It is also an object of this invention to provide a conveyor mechanism which is quiet running, which requires a minimum of attention for maintenance of its mechanical components, and which does not tend to disturb the feeding poultry. Likewise, it is a further object to provide a system which can handle various types of feed and without tending to grind the feed within the trough.

A further important object is to provide an apparatus which is readily expandable for various sizes of flocks of poultry but which is also efficient for use in connection with relatively small flocks. A more specific object of the invention is to provide a flexible conveyor element which is of simple sturdy construction, is uniform in its feed conveying capacity, and is kink-proof. These and other objects of my invention will become apparent to those skilled in the art as the description thereof proceeds.

Briefly, this invention provides an improved poultry or stock feeder of the type wherein a feed conduit comprising an open-topped horizontal trough is arranged in communication with a feed supply hopper and wherein an endless flexible distributing means comprising a distributing band having unitary paddles is moved longitudinally of the trough within a closed circuit. More particularly, according to this invention, the feed is distributed within the trough means by a continuous or endless flexible distributing band which moves longitudinally along the open-topped trough. The word "flights," as used hereinafter, has reference to the straight length of trough and to the lengths of the distributing band means which runs within the same portion of the trough means. At the corners it is desired to change the direction of travel of the endless flexible distributing means in the presence of a minimum feed. Accordingly, the feed supply hopper may be placed at any convenient point, but ordinarily will be placed over a flight just beyond a corner so as to minimize any tendency of feed to accumulate within the corner.

It is also desired to drive the endless distributing means in a closed circuit and I have devised a positive drive means which is placed at one of the corners. The drive is of rugged construction, but has a minimum of moving parts.

Preferred forms of endless flexible distributor means is a metal band impervious to feed and which has unitary paddles which will sweep the feed along the trough.

Details of my invention will be described by reference to particular embodiments thereof illustrated in the drawings wherein:

FIGURE 1 is a schematic plan view showing the general arrangement of a closed circuit feeder embodying the principles of my invention;

FIGURE 2 is an enlarged side view of a band distributor provided with the feed impellers;

FIGURE 3 is a top view of distributor of FIGURE 2 shown partly in section;

FIGURE 4 is a plan view of an idler corner in the feeder of FIGURE 1;

FIGURE 5 is a plan view of the drive corner in FIGURE 1;

FIGURE 6 is a section taken along the line 6—6 in FIGURE 4;

FIGURE 7 is a section taken along line 7—7 in FIGURE 5;

FIGURE 8 is a section taken along the line 8—8 in FIGURE 5; and

FIGURE 9 is a perspective of a section of trough and conveyor illustrating a conveyor guide.

Referring to FIGURE 1, a stock feeder is shown having an open-topped trough 10, an endless flexible distributing ribbon or conveyor band 11 having unitary paddles 11a running in the trough adjacent one side thereof, a supply hopper 12 from which feed discharges through port 12a onto the conveyor 11, drive means 13 for the band 11, and idler corners 14 for guiding the band 11 around the circuit of trough 10. Cages 15 may be arranged in appropriate manner adjacent the trough 10.

The feed conveyor band 11 according to my invention as illustrated in the drawings comprises a metal band which is impervious to feed and has feed-carrying surface 11a. The band may be from about 0.05 to 0.125 inch thick with the general characteristics of clock spring stock.

The conveyor band 11 is endless, made so by splicing, clamping connectors, etc., and is caused to travel through the trough 10 around the idler corners 14 by the power applied in the drive corner or station 13. The trough 10 may have the cross-section shown in FIGURE 8 having lip 10a, bottom wall 10b, side wall 10c and side wall 10d and the idler corners 14 may be as shown in FIGURES 1 and 4. A connector section (not shown) may be provided at the inlet and outlet of the corners 13 and 14 to merge with the adjacent ends of the troughs 10.

The idler corners 14 include shoes 14b (FIGURES 1, 4 and 6). Each idler is provided with band holddown comprising arcuate plate 21 supported by cantilever brackets 22. A self-lubricating shoe surface 14c is carried by the skid or shoe 14b as shown in FIGURE 6.

In the embodiment of FIGURE 1, the conveyor 11 travels clockwise, picking up feed from the hopper 12 and then in series through the idler corners 14 and connecting flights of trough 10, which are in substantially the same plane.

The band conveyor 11 is provided, as shown in FIGURES 2 and 3, with unitary feed impellers 11a. Intermediate each of these impellers 11a is provided slots 16b for engagement with the teeth of drive sprocket 16. In another form of drive, the pulley 16 is provided with a resilient traction facing (not shown).

To operate the conveyor band 11, there is provided a drive mechanism at corner 13 comprising traction drive sprocket 16 having teeth for engagement with the slots 16b in band 11 as shown in FIGURES 1, 2 and 5. The drive sprocket 16 is driven through drive 17, drive pulley 19, drive pulley belt 18, and motor-transmission 20, electric motor being controlled by a manual switch or timer (not shown).

The foregoing description has been with respect to a closed circuit system wherein three idler corners are associated with a single drive corner. It is contemplated, however, that the principles of design incorporated herein may be utilized in a closed trough circuit which includes only a drive end and a turnaround end with conveyor flights running in parallel therebetween in the same trough.

Reverting to the last figure in the drawings, the vertical band 11 may be held adjacent the inner wall of the trough 10 by a clip 23 having wear shoe and guide 25 supporting the lower edge and alignment guide 24 overhanging the upper edge of the band 11.

Although my apparatus has been described in terms of particular embodiments thereof which have been set forth in considerable detail, it should be understood that this is by way of illustration only and that my invention is not limited thereto. Alternative constructions and operating techniques will become apparent to those skilled in the art in view of my disclosure and, accordingly, it is contemplated that modifications can be made without departing from the spirit of the described invention.

What I claim is:

1. In a poultry feeding apparatus, the combination of an open-topped trough means and corners providing an endless circuit, said trough means having bottom and side walls, flexible endless conveyor means extending along said circuit, means for introducing feed into said trough means, said conveyor means being flat and relatively thin and running adjacent one of said walls, feed engaging portions on said conveyor arranged in planes transverse to the path of travel of said conveyor, a holddown mounted in said trough means substantially co-extensive with said corner and colinear with a segment of said conveyor passing through said corner, said holddown including an arcuate flange member arranged in a plane parallel to the normal plane of travel of said conveyor in traversing the corner and entering an adjacent flight of trough, said member being engageable by said feed engaging portions when said conveyor rises in said trough.

2. The feeding apparatus of claim 1 which includes a linear array of cages confining poultry to be fed, said trough means being substantially co-extensive with said array, and said conveyor runs along the wall of said trough means adjacent said cages and said feed engaging portions project outwardly into said trough.

3. The apparatus of claim 1 wherein said feed-engaging portions are arranged transverse to the conveyor means between opposed side walls and said portions extend a distance less than the width of the bottom wall.

4. A stock feeder comprising an open-topped trough means into which a feed supply is discharged, an endless continuous conveyor drawn through said trough means adjacent the bottom thereof, a plurality of idler corners, a drive means, each of said idler corners including a housing arranged in alignment with two adjacent flights of trough, an idler in said corner, and overhanging conveyor guide means in said corners, said guide means comprising an arcuate member in peripheral alignment with the idler and suspended over the conveyor by cantilever brackets.

5. A stock feeder comprising an open-topped trough means in which a feed supply is provided, an endless continuous conveyor band drawn through said trough means adjacent a side wall thereof, a plurality of corners, each of said corners including a housing arranged in alignment with two adjacent flights of trough, band guide means in said corner in alignment with adjacent flights of said trough, band holddown means in said corner, said holddown being substantially co-extensive with said corner and colinear with the segment of said band passing through said corner and causing said band to travel parallel to the floor of said trough when traversing the corner and on entering an adjacent flight of trough, and drive means including pulley means, and a loop of said conveyor band trained about band guide means and drive pulley means in said trough means.

6. The stock feeder of claim 5 wherein the band comprises a metal strip having unitary self paddles.

7. In a poultry feeding apparatus the combination of a feeding trough means comprising an endless trough circuit in a substantially horizontal plane, said circuit having connected linear and non-linear portions, flexible endless feed-impervious distributing band means movable edgewise within said trough means longitudinally therethrough, said band comprising a continuous ribbon strip rigid and self-supporting in a vertical plane and flexible in another plane, means for supplying power to the band to drive it through said trough means, and hopper means for supplying feed to be moved by the band along the said trough means.

8. The poultry feeding apparatus of claim 7 which includes idler shoe means in non-linear portions of said circuit, said shoe comprising a self-lubricating plastic such as nylon.

9. A stock feeder comprising an open-topped trough means into which a feed supply is discharged, an endless band comprising a continuous feed-impervious ribbon drawn edge-wise through said trough means along its bottom wall and adjacent a side wall thereof, a plurality of idler corners, a drive corner, each of said corners including a housing arranged in alignment with two adjacent flights of trough, and band holddown means in each of said corners in alignment with the upper edge of the band, said guide means comprising an arcuate plate supported by cantilever brackets fixed to the peripheral wall of the corner housing.

10. In a poultry feeding apparatus the combination of a feeding trough means comprising an endless circuit in a substantially horizontal plane, flexible endless vertically up-standing ribbon means movable within said trough means longitudinally therethrough, said ribbon being self-supporting in its edgewise travel in the endless circuit, means for supplying power to the band to drive it through said trough means, and hopper means for supplying feed to be moved by the band along the said trough means.

11. In a poultry feeding apparatus, the combination of a longitudinally extending feeding trough means, flexible endless metal ribbon means extending within said trough longitudinally thereof, means for supplying power to the ribbon to drive it along said trough means, and means for supplying feed to be moved by the ribbon means along the said trough means.

12. The poultry feeding apparatus of claim 11 which includes directional guide means operatively engaged by said endless driven means, and arcuate hold-down means associated with said guide means in spaced alignment therewith and supported by said trough means.

References Cited in the file of this patent

UNITED STATES PATENTS

| | | |
|---|---|---|
| 460,202 | Eberhardt | Sept. 29, 1891 |
| 2,533,572 | Fulke | Dec. 12, 1950 |
| 2,646,158 | Vodoz | July 21, 1953 |
| 2,683,439 | Markey | July 13, 1954 |
| 2,720,119 | Sherman | Oct. 11, 1955 |